June 18, 1957 M. A. TOWNSEND 2,796,312
STOCK FOUNTAIN CABINET
Filed Feb. 18, 1953 2 Sheets-Sheet 1
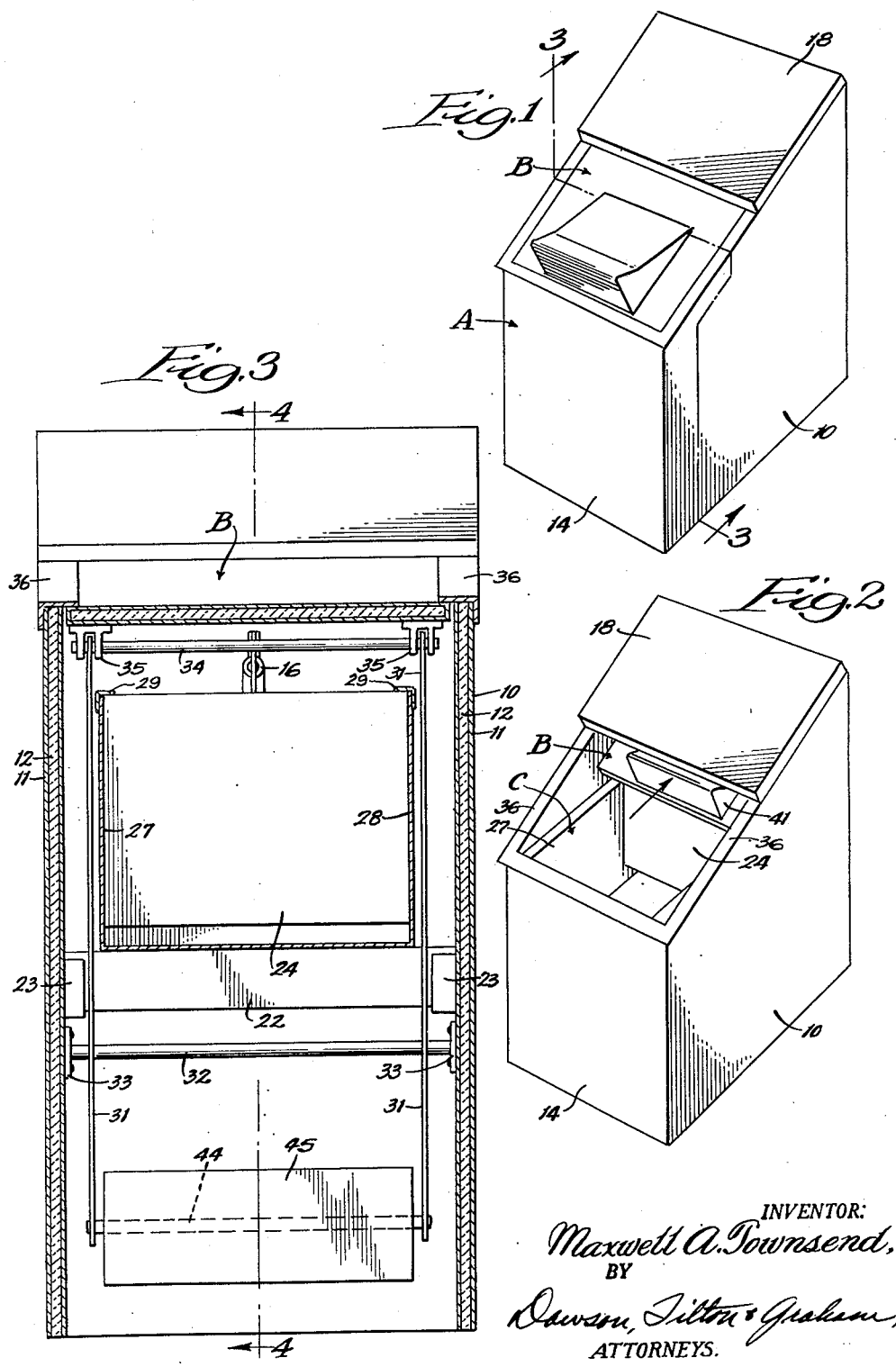
INVENTOR:
Maxwell A. Townsend,
BY
Dawson, Tilton & Graham,
ATTORNEYS.

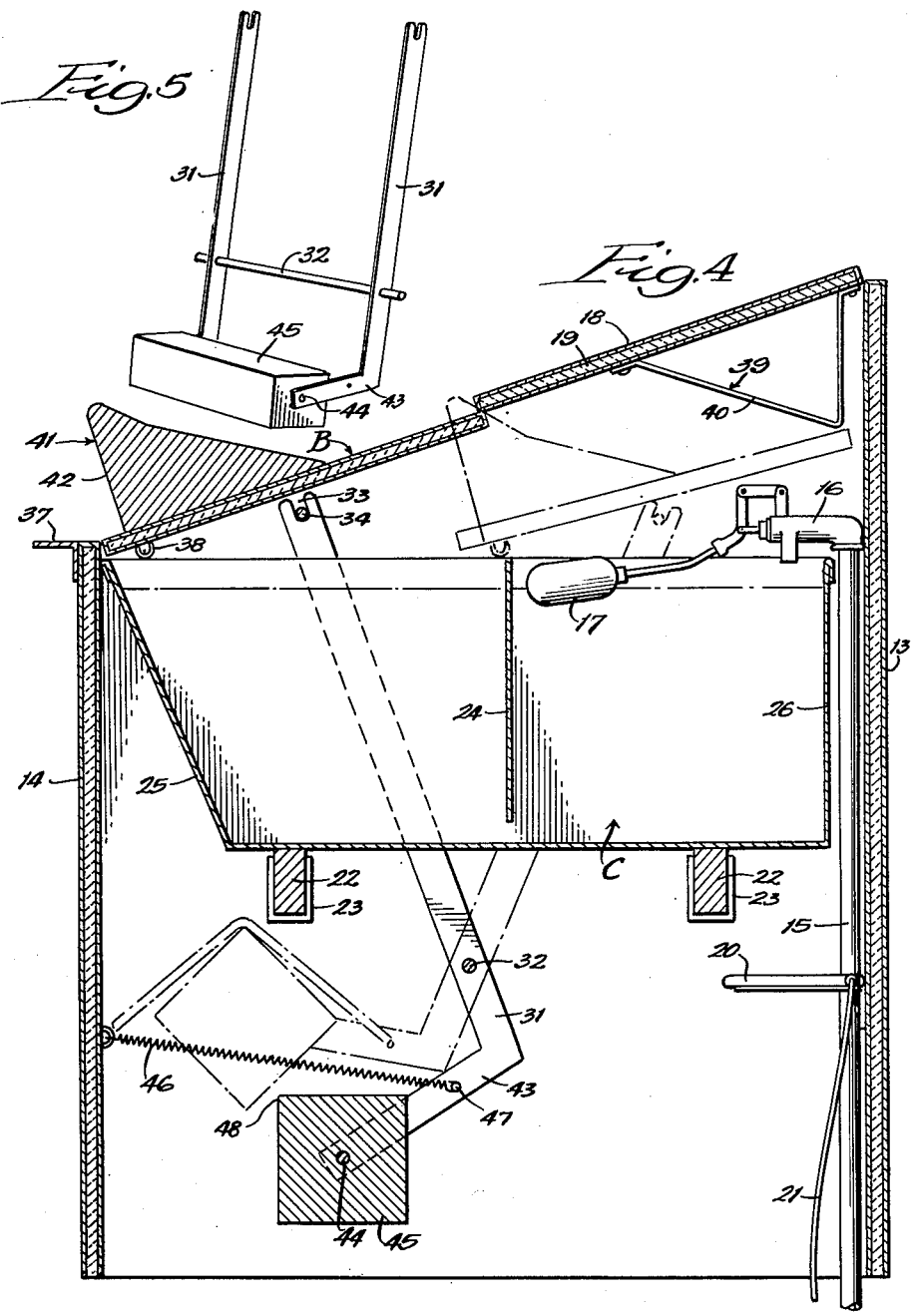

United States Patent Office 2,796,312
Patented June 18, 1957

2,796,312

STOCK FOUNTAIN CABINET

Maxwell A. Townsend, Marion, Ind.

Application February 18, 1953, Serial No. 337,458

9 Claims. (Cl. 312—319)

This invention relates to a closure-equipped structure and more particularly to a stock fountain or watering fountain having a closure member normally sealing the interior of the cabinet structure but susceptible to being opened by livestock to provide them with access to the interior of the structure.

It is very desirable to have water troughs provided for the watering of cattle and horses enclosed, because an enclosed trough prevents dust and dirt and other foreign matter from collecting on and contaminating the water. Further, enclosing the water protects it from the elements and helps to keep it cool in the summer and to keep it from freezing in the winter. Maintaining the drinking water for cattle at certain temperatures is advantageous, for it is known that cows drinking the most water produce greater quantities of milk, and more water is consumed by cows if the water is maintained at or near earth temperature. Beef-type cattle drink more water when it is maintained at earth temperature and as a result gain more weight. The weight gain is therefore cheaper.

It is possible to provide control of the temperature of drinking water for cattle if the water is contained in troughs that are completely enclosed within an insulated structure. Such an arrangement will also keep the water clean. However, it has not heretofore been feasible to enclose the drinking water for cattle and horses because an enclosure has not been devised that these animals will open readily.

I have discovered that cattle and horses will open a closure member of a cabinet structure having drinking water therein if they can push the closure member with their noses when the point of contact is within the area above the base part of the nose and if little effort or force is required to open the door or closure member.

It is, therefore, an object of this invention to provide an enclosed structure having a closure member that will be readily opened by cattle and horses. Another object of the invention is to provide a structure equipped with a closure member that will be opened readily by cattle and horses but that will close automatically and completely when the animal withdraws from the structure. Still another object of the invention is the provision of a closure member structure for a stock fountain wherein a balancing and compensating arrangement is provided so that cattle and horses can open the closure for access to the water contained therein with almost no effort yet the closure member automatically shuts when the animal removes the force that moved the closure member to open position. A further object is to provide a closure member for a stock fountain with a pusher member adapted to be engaged by the nose of a horse or cow in the area above the base of the nose, for opening of the closure member by the animal. Still another object is to provide a floating closure member for a stock fountain and in which the closure member has arranged therewith a counterweight and spring and wherein the spring aids in both opening and closing the closure member while also functioning as a shock absorber during a portion of the closing movement. Additional objects and advantages will appear as the specification proceeds.

An embodiment of my invention is illustrated in the accompanying drawings, in which—

Figure 1 is a perspective view of a stock fountain embodying my invention and in which the door or closure member is illustrated in closed position; Fig. 2 is a perspective view similar to that of Fig. 1 but showing the closure member in open position; Fig. 3 is a transverse sectional view taken on the line 3—3 of Fig. 1; Fig. 4 is a longitudinal sectional view taken on the line 4—4 of Fig. 3; and Fig. 5 is a perspective view of the closure member support arms and counterweight.

The stock fountain illustrated in the drawings includes a cabinet structure A equipped with a closure member or door B and having mounted therein a water trough C.

The cabinet A may be constructed of any suitable material and preferably has side walls 10 and 11 that may have inner and outer portions separated by insulation 12. The side walls 10 and 11 are fixedly secured to end walls 13 and 14 that may also have inner and outer portions separated by insulation 12. As seen best in Figs. 3 and 4, the cabinet A is open on the bottom so that a water pipe 15 may be brought up through the interior of the cabinet for discharging water through a valve 16 controlled by a conventional float assembly 17 into the water trough C. It is noted that the rear wall 13 of the cabinet is greater in height than the front wall 14 and the top of the cabinet is therefore sloped downwardly and forwardly. The upper side of the cabinet is closed by a lid 18 having inner and outer wall portions separated by insulation 19 and by the door or closure member B that also has inner and outer wall portions separated by insulation 19. If desired, the closure member B may be an aluminum casting and the insulation held on the underside thereof by a steel sheet rigidly secured in position.

It is preferred that the cabinet be completely insulated, for insulation facilitates the maintenance of a desirable water temperature within the cabinet. The water is therefore more readily kept cool in the summer and also more readily kept from freezing in the winter. Preferably the door or closure member B is of relatively light weight and it is preferred that the insulation 19 be, therefore, of some light weight material such as glass wool or other comparable material. On the other hand, it is not particularly necessary to have a light weight insulation between the inner and outer wall panels making up the remainder of the cabinet and any insulation may be used in the side walls and end walls. When properly insulated, very little heat is required to maintain the water within the trough C at the desired temperature and if the water trough is within a barn or other farm building it is usually not necessary to heat the interior of the cabinet. However, the cabinet is readily heated by providing an electrical heating element 20 connected to a source of electric power through leads 21. The heating element 20 may be any resistance type heater; a light bulb is suitable, or any other electrical or non-electrical source of heat may be used.

The water trough C is removably supported within the cabinet A upon transverse support bars 22 that are mounted at their ends within U-shaped brackets 23 secured to the side walls 10 and 11 of the cabinet by means of welding or rivets, etc. Preferably the water trough C is equipped with an inner wall 24 that is placed forwardly of the float assembly 17. The wall 24 will protect the float assembly from animals who will drink from the forward portion of the trough C. The lid 18 and the closure member B are both removable, as will hereinafter be described, and when these members are removed the trough C may be lifted from the supports 22 and withdrawn from the cabinet for cleaning. To provide ready removal from the trough C without disturbing the valve assembly 16 and float 17, the forward wall 25 of the trough tapers downwardly and inwardly so that the trough may be tipped upwardly at its forward end to lower the rear wall 26 below the valve and float to provide clearance thereof. As seen best in Fig. 3, the side walls 27 and 28 of the trough C are equipped at their upper edge with longitudinally-extending channel members 29 that extend from the forward wall 25 to a little beyond the center of the trough.

The closure member or door B is movably mounted and when in closed position as illustrated in Figs. 1 and 4 the door completely closes the access opening 30 provided in the upper wall of the cabinet A. To provide movement of the closure member B, a pair of support arms or levers 31 are pivotally mounted intermediate their ends upon a pivotal axis or bar 32 extending transversely of the cabinet A and carried by the side walls 10 and 11 thereof by means of brackets 33 riveted to the side walls. The upper ends of the arms 31 are bifurcated or have a U-shaped recess 33 cut therein that receives a cross bar 34 supported at each end by bifurcated brackets 35 rigidly secured to the closure member B. If the closure member B is an aluminum casting as previously described, the brackets 35 may be cast as an integral part thereof. The bar 34 is received within the U-shaped recesses 33 while the upper ends of the arms 31 are received between the spaced projections of the bifurcated members 35. Thus the closure member B is pivotally supported by the arms 31.

The arms 31 pivot between the position shown in full lines in Fig. 4 in which the closure member completely seals the access opening 30, to the position shown by broken lines in Fig. 4 and in which the access opening 30 is completely uncovered by the closure member B. To insure that the closure member B is not lifted from its pivotal support upon the levers or arms 31, the upper edges of the cabinet side walls 10 and 11 are equipped which channel members 36 that have an inwardly-extending flange covering the outer edges of the closure member B. Thus the closure member is confined within the cabinet by the channel members 36. If desired, a reinforcing channel 37 may be provided extending transversely of the forward wall 14 of the cabinet and rigidly secured thereto at the upper edge of the wall. Though normally the closure member B floats free of any structure other than the arms 31 during the closing and opening movements of the door, rollers 38 are provided at each side of the door B and adjacent the forward edge thereof that are aligned with the channels or tracks 29 mounted upon the side walls of the trough C. When the door or closure member B is in the closed position illustrated in Fig. 4, the rollers 38 rest upon the tracks or channels 29 and also, as illustrated by the broken lines in Fig. 4, the rollers rest upon the members 29 when the door is completely open. However, intermediate these two positions the rollers do not normally ride upon the channels 29.

To obivate any chance of the door or closure member B being lifted from its pivotal mounting upon the arms 31 during the opening and closing movements, the lid 18 at its rear end is equipped with a generally V-shaped bracket 39 having a relatively long sloping side 40 that, when necessary, the rear edge of the closure member B rides against and is forced downwardly to maintain the seating of the closure member upon the arms 31.

As has been previously brought out, livestock such as cows and horses will not readily open a closure member to gain access to drinking water housed within a cabinet that is completely closed when the closure member seals the access opening of the cabinet. Only when the cattle can push with their noses above the base part thereof and against a substantially weightless closure member will the animals resort to opening the closure to make available their drinking water. In order that the animals can push against the door or closure member with the portion of their noses above the base, the upper wall and the door are angularly disposed and are slanted or inclined downwardly and forwardly. Thus the pusher member or bracket 41 has a forward wall 42 that is angularly disposed relative to a perpendicular axis but is mounted upon the closure member so that the wall 42 is perpendicular to the surface of the closure member. When the animal steps in front of the cabinet A it is seen that the portion of his nose above the base will engage the upper edge of the forward wall 42 and the animal will not be discouraged from pushing against the pusher member 41 since the base part of its nose will not at this time be directly engaging the pusher member. The pusher member 41 may be mounted upon the access door B by any suitable means such as welding or riveting, etc.; or if the door B is a casting, the member 41 may be cast integrally therewith and the door and pusher member then form a unitary structure.

At their lower ends the brackets or lever arms 31 are equipped with laterally-extending legs or portions 43 having extending therebetween a support bar 44 upon which is rigidly mounted a counterweight 45. The counterweight is so related to the pivotal axis 32 of the arms 31 and the closure member B that it is effective to constantly bias the closure member in closed position. That is, when the door is closed as illustrated in Fig. 4, the counterweight tends to hold the door in closed position and when the door is opened the tendency of the counterweight is to move it to closed position. This in effect adds to the weight of the door and would be sufficient to discourage cows or horses from opening the closure member by pushing against it with their noses. Yet if the stock fountain is to have value the door must automatically close and be held in closed position when the fountain is not being used.

To overcome the effects of the counterweight 45 while not destroying its function, an elongated helical spring 46 is secured at one end to the end wall 14 of the cabinet and at its other end to a transverse bar 47 extending between the laterally-extending portions 43 and rigidly secured thereto. The spring 46 is so chosen that when the door B is in closed position as illustrated in Fig. 4 by solid lines and the counterweight 45 and arms 31 are in their corresponding positions, the spring is elongated or is tensioned so that it is pulling against the extensions 43 and is exerting a force that tends to open the door B. The combined effect of the spring and the counterweight is to make the door B substantially weightless when it is in closed position but yet insuring that it does stay in closed position. An animal, then, pushing his nose against the pusher plate or bracket 41 does not encounter a resistive force of sufficient magnitude to discourage his pushing against the member to open the door B.

When the door B has been partially opened (approximately halfway), the spring 46 is slack and the corner 48 of the counterweight 45 has moved upwardly so that it is touching the spring 46. Further movement of the door B into open position causes the counterweight 45 to move upwardly and to distend the spring 46 as illustrated by broken lines in Fig. 4. At this time the spring is exerting a downward force upon the counterweight and this force added to the weight of the counterweight 45 tends to close the door B. However, only slight force is needed to hold the door open and the drinking of the animal is not disturbed. However, when the animal withdraws from contact with the pusher plate 41 the action of the spring and counterweight moves the closure member B toward closed position; but before the closure member reaches the completely closed position the spring 46 is extended or tensioned and it tends to retard the movement of the door B and arms 31 and acts as a shock absorber, and slows the movement of the door and its associated structure.

Operation

In operation of the structure, water flows through the pipe 15 and into the trough C until the float 17 is raised to a point at which the valve 16 is closed. The float and valve function in a conventional manner to maintain the water level in the trough C. The animals, after they have been taught to use the stock fountain, push their noses against the pusher plate 41 and finding that the resistance to their push is infinitesimal and that their noses engage the pusher plate at some point above the base of the nose, they push the closure member B open and are thereby provided with access to the water trough C. When the animal has completed drinking, the counterweight and spring insure the closing of the door B to seal the interior of the stock fountain, while the spring also acts as a shock absorber during the closing of the door and also insures that the door is substantially weightless during the initial opening movement thereof. During the opening of the door and the closing thereof it normally floats, but if the animal for some reason pushes downwardly upon the forward portion of the closure door, the rollers 38 roll along the track or channel members 29 while the rear edge of the closure door is engaged by the bracket 39 and the door is held within its pivotal mounting on the arms 31. Since the door normally floats during movement thereof, there is no frictional resistance to the movement of the door through the rollers, etc., and ice and snow do not readily cause sticking of the door.

The insulation is effective to keep the water cool in the summer and to keep it from freezing in the winter, while at all times the water is covered and therefore remains clean. If the temperatures are particularly low the heating element 20 will raise the temperature within the insulated cabinet and the water within the trough as well as within the pipe and valve will be held above freezing temperatures. If desired, a portion of the pipe 15 within the ground below the stock fountain may be surrounded by tile that will act as a conductor and facilitate the rising of earth heat into the cabinet. This will further tend to keep the temperature within the cabinet at some desired value and to prevent freezing of the water.

The lid 18 is removably mounted upon the cabinet and when it is removed the closure member B may be swung rearwardly and lifted from the arms 31. This is possible since the retaining channels 36 do not extend the entire length of the cabinet. When the lid 18 and the closure member B are removed, the trough C may be withdrawn from the cabinet by tilting the forward end upwardly. The trough is thereby readily removed for cleaning.

It is relatively easy to teach animals to use the stock fountain. I have found that if the closure door B is left open for a few days and the animals permitted to drink from the fountain and then the closure door is left open one-third of the way for a few days and the animals still made to drink from the fountain, that thereafter the door may be completely closed and the animals will push it open to avail themselves of the drinking water therein. Animals with horns pose no problem, since the closure member is being opened by the nose of the animal and the arrangement illustrated avoids all interference of horns with the opening of the door.

While in the foregoing specification I have set forth an embodiment of my invention in great detail for purposes of illustration, it is apparent that the details may be varied widely by those skilled in the art without departing from the spirit of the invention.

I claim:

1. A stock fountain, comprising a cabinet having side walls and an inclined top wall provided with an opening therein, a pair of lever arms pivotally mounted intermediate their ends within said cabinet and providing at their upper ends a pivotal mounting for a closure member, an inclined closure member pivotally mounted upon the upper ends of said lever arms and providing a closure for said opening, a pusher member mounted upon said closure member and extending upwardly therefrom and having a forward wall substantially perpendicular to the surface of said pusher member whereby the forward wall is inclined outwardly and forwardly with respect to a vertical plane therethrough, a bracket depending from said top wall rearwardly of said opening and in the path of movement of said closure member for engagement therewith during the opening thereof to maintain it in substantially the same inclined attitude and prevent it from being knocked from its pivotal mounting upon said lever members, said levers being equipped below said pivotal axis with forwardly-extending portions, a counterweight mounted upon said portions to bias said closure member toward closed position, and a spring secured to said cabinet and to said extensions and extending across the path of movement followed by said counterweight when said closure member is moved to open position for resilient engagement therewith, said spring being tensioned for applying a force to said lever arms when said closure member is in closed position to balance the effects of said counterweight, said spring being distended by engagement with said counterweight when said closure member is moved toward open position whereby the restorative forces of said spring are at such time additive to the effects of said counterweight.

2. In a cabinet providing a compartment therein and in which a water trough is adapted to be supported, said cabinet having a downwardly and forwardly inclined top wall provided with an access opening, a pair of elongated lever arms pivotally mounted intermediate their ends within said cabinet and equipped at their lower ends with forwardly extending portions, a counter-weight carried by said forwardly extending portions, a spring secured at one end to said cabinet and at its other end to said forwardly extending portions and being arranged to cooperate with said counterweight in the swinging of said lever arm, a closure member pivotally mounted upon the upper ends of said lever arms, a pusher member mounted upon said closure member and providing means for pushing said closure member from closed to open position, and channel members provided within said compartment, said closure member being equipped at its forward end with rollers adapted to ride upon said channel members.

3. The structure of claim 2 in which said top wall is equipped adjacent its rear edge with a downwardly extending bracket adapted to engage said closure member to hold it in its pivotal mounting upon said lever arms.

4. In a cabinet providing a compartment therein adapted to receive a water trough, said cabinet having an inclined top wall provided with an access opening in said compartment, a pair of elongated lever arms pivotally mounted within said cabinet intermediate their ends and having at their lower ends forwardly extending portions, a counterweight carried by said forwardly extending portions, a spring secured at one end to said cabinet and at its other end to said arms and being arranged to cooperate with said counterweight in the swinging of said lever arms, a closure member pivotally carried at the upper ends of said lever arms, a pusher member mounted upon said closure member and providing means for moving the same from closed to open position, said closure member being inclined in substantial parallelism with said inclined top wall, and means for maintaining said closure member in such inclined position during movement thereof between closed and open positions, said last mentioned means comprising a bracket depending from said inclined top wall and being disposed in the path of movement from closed to open position of said closure member for engaging an edge thereof.

5. In a stock fountain structure of the character described, a cabinet providing a compartment therein adapted to receive a water trough and having an access opening in a wall thereof, a closure member for said opening and being movable between closed and open positions, means supporting said closure member for such movement, a counterweight carried by said means and being disposed for biasing said closure member toward closed position, and a spring connected with said means and being normally tensioned for biasing said closure member toward open position and thereby tending to counter-balance said counterweight, said spring being disposed in the path of movement of said counterweight when said closure member is moved from closed to open position for engagement by said counterweight and distension thereby, whereby said spring then supplements the force of said counterweight tending to move the closure member toward closed position.

6. The stock fountain structure of claim 5 in which said means comprises a pair of elongated lever arms pivotally mounted intermediate the ends thereof, said lever arms being pivotally secured at the upper ends thereof to said closure members, and said counterweight being carried by the lever arms adjacent the lower ends thereof.

7. In a stock fountain structure, a cabinet defining a compartment therein adapted to receive a water trough and having a top wall provided with an access opening, a closure member for selectively closing said access opening, lever arms mounted intermediate the ends thereof for pivotal movement within said cabinet and carrying at their upper ends said closure member, a counterweight carried by said lever arms and being oriented with respect thereto for biasing said closure member toward closed position, and a spring secured at one end to said cabinet and at its other end to said lever arms and being disposed in the path of movement of said counterweight when said closure member is moved from closed to open position, said spring being normally tensioned when said closure member is closed for biasing the same toward open position and thereby tending to counter-balance said counterweight, said spring being engaged by said counterweight and distended by said engagement when said closure member is moved toward open position whereby the spring then supplements the biasing action of said counterweight in tending to move said closure member toward closed position.

8. The stock fountain of claim 7 in which said top wall is inclined and in which means are provided for maintaining said closure member at an attitude of substantial parallelism with said inclined top wall irrespective of the position of the closure member with respect to said access opening.

9. The structure of claim 8 in which said last mentioned means comprises channel members mounted within said compartment, roller members carried by said closure member adjacent the lower edge thereof and being disposed for riding engagement in said channel members, a pusher member carried by said closure member and biasing the lower end thereof for engagement of the roller members with said channel members, and a depending bracket carried by said inclined top wall and disposed in the path of movement of said closure member for engagement with the forward edge thereof as the closure member moves from closed to open position.

References Cited in the file of this patent

UNITED STATES PATENTS

| | | |
|---|---|---|
| 463,150 | Graves | Nov. 17, 1891 |
| 859,720 | Appelhans | July 9, 1907 |
| 1,507,159 | Cosford | Sept. 2, 1924 |
| 2,188,708 | Davis | Jan. 30, 1940 |
| 2,202,277 | Visser | May 28, 1940 |
| 2,492,604 | Townsend | Dec. 27, 1949 |
| 2,564,336 | Lien | Aug. 14, 1951 |
| 2,589,427 | Ossmann | Mar. 18, 1952 |